US008829862B2

(12) United States Patent
Chassard et al.

(10) Patent No.: US 8,829,862 B2
(45) Date of Patent: Sep. 9, 2014

(54) ALTERNATOR VOLTAGE REGULATOR WITH A PROGRAMMABLE SIGNAL PROCESSING INTERFACE

(75) Inventors: Pierre Chassard, Creteil (FR); Pierre Tisserand, Limeil Brevannes (FR); Vincent Gendron, Saint Maur des Fosses (FR); Philippe Hazard, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 606 days.

(21) Appl. No.: 13/126,830

(22) PCT Filed: Oct. 15, 2009

(86) PCT No.: PCT/FR2009/051967
§ 371 (c)(1),
(2), (4) Date: Oct. 25, 2011

(87) PCT Pub. No.: WO2010/049618
PCT Pub. Date: May 6, 2010

(65) Prior Publication Data
US 2012/0032650 A1  Feb. 9, 2012

(30) Foreign Application Priority Data

Oct. 30, 2008  (FR) ..................................... 08 57396

(51) Int. Cl.
*H02P 9/00* (2006.01)
(52) U.S. Cl.
USPC ................................. 322/44; 322/22; 322/24
(58) Field of Classification Search
USPC .............. 322/20, 22, 24, 28, 44; 700/37, 286; 307/10.1
See application file for complete search history.

(56) References Cited

U.S. PATENT DOCUMENTS

| 4,920,308 | A  | * | 4/1990 | Edwards et al. ................ 322/58 |
| 5,325,043 | A  | * | 6/1994 | Parro .............................. 322/23 |
| 6,157,089 | A  | * | 12/2000 | Xu ................................. 307/9.1 |
| 6,249,060 | B1 | * | 6/2001 | Osha ........................... 307/10.1 |
| 6,316,919 | B1 | * | 11/2001 | Sumimoto et al. .............. 322/28 |
| 6,555,930 | B1 |   | 4/2003 | Kohl et al. |
| 2007/0085510 | A1 |   | 4/2007 | Asada |
| 2007/0085512 | A1 | * | 4/2007 | Maehara ........................ 322/28 |
| 2008/0084190 | A1 |   | 4/2008 | Harmon et al. |

FOREIGN PATENT DOCUMENTS

| DE | 102004037259 | 2/2006 |
| EP | 1193825 | 4/2002 |
| FR | 2854715 | 11/2004 |

* cited by examiner

*Primary Examiner* — Tulsidas C Patel
*Assistant Examiner* — Viet Nguyen
(74) *Attorney, Agent, or Firm* — Berenato & White, LLC

(57) ABSTRACT

A motor vehicle regulator, including electronic regulation circuits, which can produce an excitation current in accordance with a difference between a set voltage and an output voltage measured at the terminals of an electric battery of the vehicle. The regulation circuits including a programmable signal processing interface for producing a signal, which is representative of the excitation current. The interface receives as input a plurality of signals which are representative of the excitation current. The interface including a device capable of selecting a signal which is representative, from amongst the plurality of representative signals, of the method for applying different forms of processing to the representative signal selected, and a second device for selection of processing to be applied to the representative signal. The representative signal, and the processing to be applied, being selected according to a program provided to the programmable signal interface.

9 Claims, 5 Drawing Sheets

ALTERNATOR VOLTAGE REGULATOR WITH A PROGRAMMABLE SIGNAL PROCESSING INTERFACE

CROSS-REFERENCE TO RELATED APPLICATIONS AND CLAIM TO PRIORITY

This application relates to International Application No. PCT/FR2009/051967 filed Oct. 15, 2009 and French Patent Application No. 08/57396 filed Oct. 30, 2008, of which the disclosures are incorporated herein by reference and to which priority is claimed.

FIELD OF THE INVENTION

The present invention applies in general to the field of motor vehicles. More particularly, the invention relates to an improved voltage regulator which is designed to equip alternators of motor vehicles.

BACKGROUND OF THE INVENTION

In the alternators presently available, a communication connection is very often provided between a voltage regulator included in the alternator and an electronic control unit of the vehicle.

This electronic control unit is frequently the so-called engine control unit, which is dedicated to the control and management of the thermal motorisation of the motor vehicle, but can also assure the control and monitoring of the alternator.

By means of this communication connection, the electronic control unit can communicate with the regulator of the alternator, and control a particular functioning mode of the latter. Thus, it is possible for the electronic control unit to provide the regulator with instructions such as a voltage command, and to receive in return information relating to the actual functioning of the alternator.

The information which is transmitted in return to the electronic control unit by the regulator is often information relating to an excitation current of the alternator. This information allows the electronic control unit to verify the state of functioning of the alternator in relation to the instructions provided, and optionally to adjust these instructions by creating an additional regulation loop which is added to the one created locally by the regulator itself.

According to the motor vehicle manufacturers, the signals which are representative of the information required in return, in relation to an excitation current of the alternator, are different. In fact, certain manufacturers require the part manufacturer to design a regulator which can provide the electronic control unit with a pulse width modulated (PWM) signal which is present at the output of a PWM modulator included in the regulator. Other manufacturers prefer to have a signal which is directly representative of the signal which is present on the gate of a power MOSFET transistor which is present in the regulator, and supplies the excitation coil of the alternator with switched current, and yet others prefer the electronic control unit to receive a signal which represents directly the excitation voltage at the terminals of the excitation coil of the alternator.

A situation of this type has the consequence of making the task of the part manufacturer more difficult, and of increasing the costs, since the latter must continually adapt and modify their circuits in order to fulfill the needs of different clients.

SUMMARY OF THE INVENTION

The main objective of the present invention is to provide a voltage regulator for a motor vehicle alternator which does not have the above-described disadvantages.

A regulator according to the present invention comprises electronic regulation circuits which can produce an excitation current which is designed for an excitation coil of the alternator, the said excitation current being produced in accordance with a difference between a set voltage and an output voltage which is measured at the terminals of an electric battery of the vehicle, to which the alternator is connected electrically, and means for producing a signal which is representative of the excitation current, and transmitting the latter to an electronic control unit of the vehicle.

According to the invention, the means for production and transmission comprise a programmable signal processing interface, which receives as input a plurality of signals which are representative of the excitation current, with the interface comprising first means for selection of a signal which is representative, from amongst the plurality of representative signals, of the means for applying different forms of processing to the representative signal selected, and second means for selection of processing to be applied to the said representative signal selected, with the representative signal selected and the processing to be applied being selected according to a programming word.

According to a preferred embodiment of the invention, the signal which is representative of the excitation current is a signal of the pulse width modulation type known as "PWM".

According to other particular characteristics of the invention, the means for application of different forms of processing can comprise:
  means for carrying out processing for limitation of a cyclical ratio of the representative signal processed, and authorising a variation of the cyclical ratio only between a predetermined minimum value and a predetermined maximum value;
  means for carrying out processing for calculation of a sliding mean on the representative signal processed;
  means for carrying out low-pass filtering processing on the representative signal processed; and/or
  means for carrying out processing for change of frequency on the representative signal processed.
According to another characteristic of the invention, the interface is of the digital type, and comprises an analogue-digital converter with a cyclical ratio, and a digital-analogue converter with a cyclical ratio for the corresponding conversions of the representative signal.

According to other aspects, the invention also relates to an alternator for a motor vehicle comprising a regulator as previously described briefly, and a motor vehicle which incorporates an alternator of this type.

Other advantages and characteristics of the present invention will become more apparent from reading the following description of several particular embodiments, with reference to the attached drawings.

DESCRIPTION OF PARTICULAR EMBODIMENTS OF THE INVENTION

Figure 1:
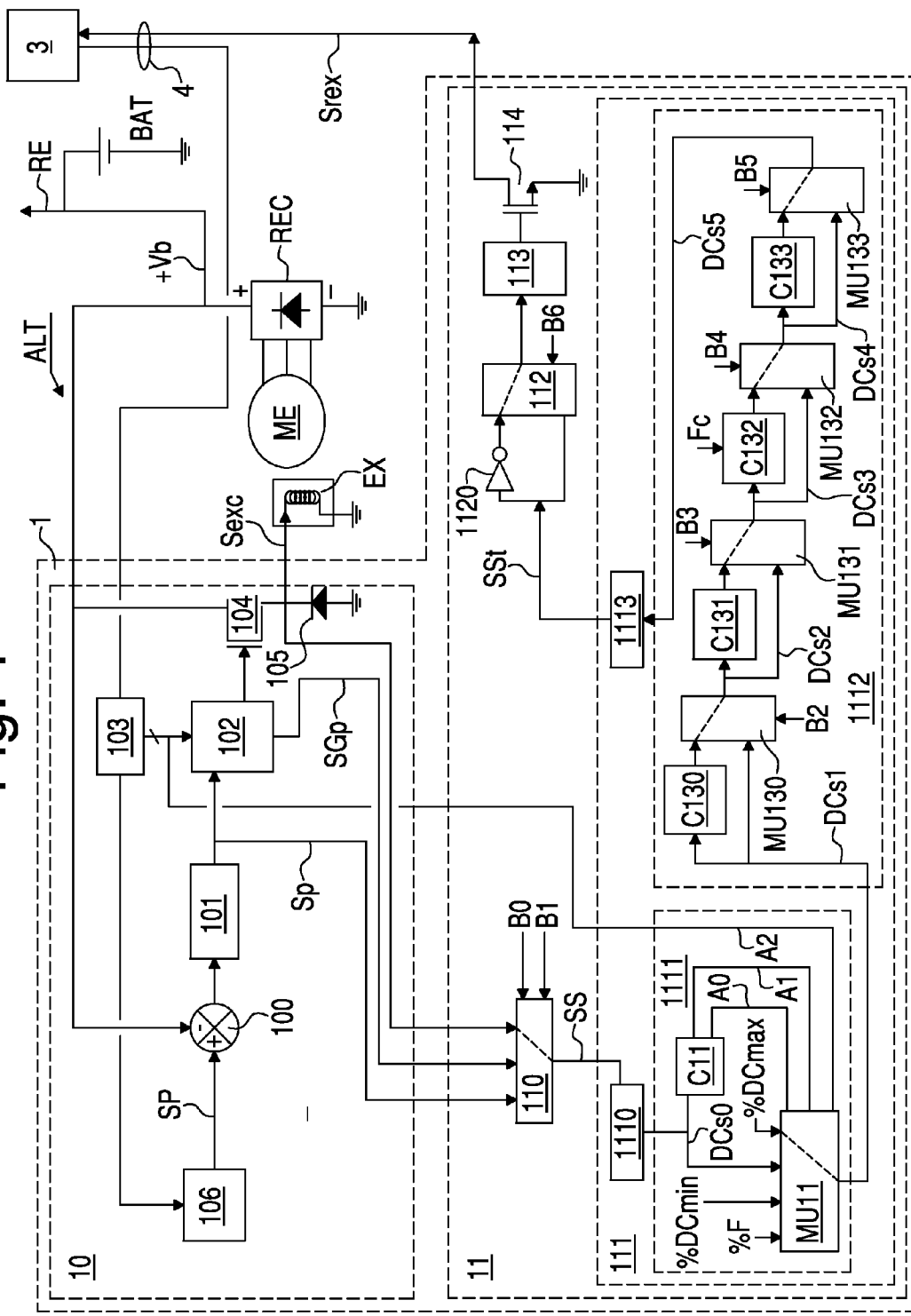
FIG. 1 is a general block diagram of an alternator for a motor vehicle, including a voltage regulator which is equipped with a programmable signal processing interface according to a particular embodiment of the invention.

With reference to FIG. 1, a description is now provided of an alternator ALT comprising a rotary electrical machine ME, a rectifier bridge REC and a voltage regulator 1.

The machine ME is for example of the three-phase type, and comprises phase stator windings which are connected to corresponding branches (not represented) of the rectifier bridge REC.

The rectifier bridge REC provides a voltage +Vb which supplies an on-board electrical network RE of the vehicle, and keeps an electric battery BAT which is associated with the network RE charged.

As shown schematically in FIG. 1, the electrical machine ME comprises an excitation coil EX which is accommodated in a rotor (not represented) of the rotary electrical machine ME.

In a known manner, the output voltage +Vb is regulated by intervening on the mean intensity of an excitation current which circulates in the excitation coil EX.

A particular embodiment of the voltage regulator 1 for an alternator according to the invention is represented in FIG. 1.

As shown in FIG. 1, the regulator 1 comprises an electronic regulation circuit 10 and a programmable signal processing interface 11.

The electronic regulation circuit 10 substantially comprises an error calculation subtractor 100, a pulse width modulator 101 known as PWM, an excitation control circuit 102, a state machine 103, and a power stage comprising a MOSFET transistor 104 and a free wheel diode 105.

The subtractor 100 calculates in a conventional manner an error between a set voltage SP 106 and the voltage +Vb measured at a positive voltage terminal+of the alternator, which voltage output terminal is connected to the electric battery BAT of the on-board electrical network RE of the vehicle.

The set voltage SP is generally supplied by the engine control unit 3 to the regulator 1. A two-way communication connection 4 between the regulator 1 and the engine control unit 3 authorises exchanges of information between these two elements 1 and 3.

The error which is calculated by the subtractor 100 is supplied as input to the PWM modulator 101.

The PWM modulator 101 supplies a signal Sp with modulated pulse width, and the cyclical ratio of which is representative of the error calculated by the subtractor 100. The signal Sp is supplied as input to the excitation control circuit 102.

The excitation control circuit 102 is controlled by the state machine 103, in which there is implanted the logic which controls the functioning of the regulator 1. This type of circuit is known by persons skilled in the art, and will not be described in detail here. In a conventional manner, it can comprise a multiplexer for selection according to the functioning mode of a signal which is designed for control of the MOSFET transistor 104. In addition, drive circuits known as drivers, such as load pumps and the like, are generally necessary in the circuit 102, so as to produce a signal which can drive the gate electrode of the transistor 104.

As shown in FIG. 1, the excitation control circuit 102 comprises two signal outputs. A first output drives the gate of the transistor 104. A second output provides a gate control image signal SGp, which is directly representative of the signal which is present at the gate of the transistor 104, but has levels which are designed for supply to the signal processing interface 11. In the normal regulation mode, the gate control image signal SGp is in PWM modulation, and corresponds to the signal applied to the MOSFET gate 104.

In a conventional manner, the state machine 103 takes into account information which is obtained locally (for example, the temperature of the electrical machine ME) and external information and instructions which are supplied by the engine control unit 3, and determines a functioning mode which is suitable for the situation.

The excitation control circuit 102 implements the functioning mode commanded by the state machine 103, for example by limiting the cyclical ratio in the case of an abnormally high temperature in the electrical machine ME.

The power stage, comprising the MOSFET transistor 104 and the free wheel diode 105 is represented schematically in FIG. 1.

In this particular embodiment with a MOSFET transistor of type P and a so-called "high-side" assembly, a source electrode of the transistor 104 is connected to the voltage+Vb, and a drain electrode of the transistor is connected both to a cathode of the free wheel diode 105, and to an end of the excitation coil EX. An anode of the free wheel diode 105 is connected to earth together with the other end of the excitation coil EX.

A so-called excitation signal Sexc is produced at the level of the point of connection between the drain of the transistor 104, the cathode of the free wheel diode 105 and the corresponding connected end of the coil EX.

As shown in FIG. 1, the signals Sp, SGp and Sexc are supplied as input to the programmable signal processing interface 11.

As also shown in FIG. 1, the programmable signal processing interface 11 substantially comprises an input selection circuit 110, a signal processing circuit 111, an output selection circuit 112, a driver 113 and a transistor 114.

The transistor 114 is fitted in an open collector or an open drain, and supplies as output an excitation return signal Srex which is transmitted to the engine control unit 3 by means of the communication connection 4.

The input selection circuit 110 is a multiplexer with 3 inputs and 1 output. The inputs of the input selection circuit 110 receive respectively the signals Sp, SGp and Sexc. The circuit 110 supplies as output a signal SS which corresponds to the signal selected from amongst the signals Sp, SGp and Sexc.

Bits B0 and B1 of a programming word MP=<<B0B1B2B3B4B5B6>> are applied to circuit selection inputs 110, and determine by means of their states the signal selected SS=Sp, SS=SGp or SS=Sexc present at the output of the circuit 110. The programming word MP is stored in the interface 11, and permits configuration of the latter in accordance with the application concerned.

The following table indicates an example of selection carried out on the basis of the bits B0, B1:

| B0 | B1 | Signal selected SS |
|---|---|---|
| 0 | 0 | Signal Sp |
| 0 | 1 | Signal SGp |
| 1 | 0 | Signal Sexc |
| 1 | 1 | Reserved combination |

The signal processing circuit 111 comprises a cyclical ratio analogue-digital converter 1110, a cyclical ratio limitation circuit 1111, mean, filtering and decimation circuits 1112, and a cyclical ratio digital-analogue converter 1113.

The cyclical ratio analogue-digital converter 1110 converts the analogue signal SS which is supplied by the input selection circuit 110 into a digital signal DCs0, formed by a succession of binary words which represent the time values of the cyclical ratio of the signal SS. The digital signal DCs0 is designed to be processed by the digital circuits downstream. The cyclical ratio limitation circuit 1111 comprises a comparator C11 and a multiplexer MU11.

The comparator C11 receives the digital signal DCs0 as input, and carries out a double comparison of the cyclical ratio of the latter with a minimum reference value % MinRef and a maximum reference value % MaxRef.

First and second outputs of the comparator C11 supply bits A0 and A1, the binary state of which represents respectively the comparison results:

A0=<<1>>=>DCs0>% MinRef

A1=<<1>>=>DCs0>% MaxRef

The above comparison results are used by the cyclical ratio limitation circuit 1111 in a first functioning mode, which is the normal functioning mode of the alternator ALT. In this first mode, the values % MinRef and % MaxRef define a window of values which is the one which affects the engine control unit 3. In addition, these low and high limitations % MinRef and % MaxRef of the cyclical ratio of the signal have the advantage of maintaining a signal which has activity on the return route of the communication connection 4 (in the direction towards the engine control unit 3), thus preventing in the case in question a signal which does not develop with a cyclical ratio at 0 or 100%. It will be noted here that this activity of the signal permits detection by the unit 3 of the good continuity of the connection, and of the fact that the latter is actually operational.

As shown in FIG. 1, the multiplexer MU11 comprises 4 data input ports and 1 data output port, as well as 3 selection inputs which receive respectively the bits A0, A1 and a bit A2.

The 4 data input ports of the multiplexer MU11 receive respectively the digital signal DCs0 and predetermined digital values % DCmin, % DCmax and % F.

The data output of the MU11 has the reference DCs1, and becomes equal to one of the 4 inputs present at the data input ports, according to the states of the selection inputs A0, A1 and A2.

As previously stated, the states of the bits A0 and A1 are determined by the comparisons made in the circuit C11. The bit A2 is a mode selection bit, the binary state "0" or "1" of which is determined by the state machine 103. The table below indicates the output DCs1 according to the states of the bits A0 to A2.

| Comparisons C11 | A0 | A1 | A2 | DCs1 |
|---|---|---|---|---|
| DCs0 < % MinRef | 0 | 0 | 0 | % DCmin |
| % MinRef < DCs0 < % MaxRef | 1 | 0 | 0 | DCs0 |
| DCs0 > % MaxRef | 1 | 1 | 0 | % DCmax |
|  | x | x | 1 | % F |

The letter "x" in the table indicates a state which is "indifferent" for the bits concerned.

Figure 2:
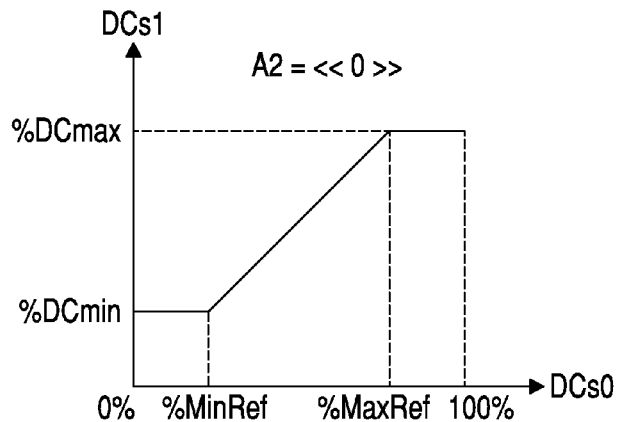
FIG. 2 is a curve showing a cyclical ratio limitation function which is implemented in the programmable signal processing interface in FIG. 1.

The function which is carried out by the circuit 111 in the first functioning mode (A2="0") is illustrated by the curve in FIG. 2.

In general, and in this particular embodiment, the limit values % DCmin and % DCmax are respectively equal to % MinRef and % MaxRef, in order to provide the engine control unit 3 with an excitation return signal which is the image of the real situation from amongst the limit values % MinRef=% DCmin and % MaxRef=% DCmax. However, it is not excluded that the values % MinRef, % MaxRef and % DCmin, % DCmax may differ, for example, by a coefficient of proportionality, in certain applications of the invention.

The bit A2="0" selects the first functioning mode, which is described more particularly here.

The bit A2="1" selects a second functioning mode, which is determined by the state machine 103. This second functioning mode is selected for example when an instruction or corresponding information is received from the engine control unit 3.

This second functioning mode can correspond to a particular functioning phase of the vehicle, such as, for example, a phase in which the engine control unit 3 commands deactivation of the alternator ALT in order to prevent collection of mechanical torque from the shaft of the thermal engine. In such a case, the communication protocol which is agreed between the engine control unit 3 and the regulator 1 may include transmission by the regulator 1 of a predetermined confirmation value to the engine control unit 3, so as to indicate to the unit 3 that its instruction relating to this second functioning mode has been taken into account. This predetermined confirmation value is represented in FIG. 1 by the value % F.

It will be appreciated that the invention is not limited solely to this second functioning mode previously described, but can comprises other different second functioning modes, which will then be selected by several bits of type A2, to which the transmission of other different predetermined confirmation values of type % F can correspond.

As shown in FIG. 1, the digital signal DCs1 which is supplied by the cyclical ratio limitation circuit 1111 is supplied as input to the mean, filtering and decimation circuits 1112.

The function of the circuits 1112 is to carry out processing of the signal DCs1 by averaging, filtering, and/or decimation. The exact nature of the processing carried out is determined by the respective states of the bits B2 to B5 of the programming word MP=<<B0B1B2B3B4B5B6>>.

The circuits 1112 substantially comprise a mean circuit C130, a first low-pass filtering circuit C131, a decimation circuit C132, a second low-pass filtering circuit C133, and multiplexers MU130, MU131, MU132 and MU133 of the type with 2 data input ports and 1 data output port.

The multiplexers MU130, MU131, MU132 and MU133 receive respectively the programming bits B2, B3, B4, and B5 at corresponding selection inputs.

The signal DCs1 is applied to a data input port of the mean circuit C130 and to a first data input port of the multiplexer MU130. A second data input port of the multiplexer MU130 receives the signal DCs1 as input.

The multiplexer MU130 supplies a digital signal DCs2 via its data output port. According to the state of the programming bit B2, the multiplexer MU130 supplies via its data output port either a signal DC2S which corresponds to the signal DCs1 as supplied by MUM or a signal DCs2 which corresponds to the signal DCs1 after processing by the mean circuit C130. The signal DCs2 is applied to a data input port of the first low-pass filtering circuit C131, and to a first data input port of the multiplexer MU131. A second data input port of the multiplexer MU131 receives the signal DCs2 as input.

The multiplexer MU131 supplies a digital signal DCs3 via its data output port. According to the state of the programming bit B3, the multiplexer MU131 supplies via its data output port either a signal DCs3 which corresponds to the signal DCs2, or a signal DCs3 which corresponds to the signal DCs2, after processing by the first low-pass filtering circuit C131.

The signal DCs3 is applied to a data input port of the decimation circuit C132, and to a first data input port of the multiplexer MU132. A second data input port of the multiplexer MU132 receives the signal DCs3 as input.

The multiplexer MU132 supplies a digital signal DCs4 via its data output port. According to the state of the programming bit B4, the multiplexer MU132 supplies via its data output port either a signal DCs4 which corresponds to the signal DCs3, or a signal DCs4 which corresponds to the signal DCs3, after processing by the decimation circuit C132.

The signal DCs4 is applied to a data input port of the second low-pass filtering circuit C133, and to a first data input port of the multiplexer MU133. A second data input port of the multiplexer MU133 receives the signal DCs4 as input.

The multiplexer MU133 supplies a digital signal DCs5 via its data output port. According to the state of the programming bit B5, the multiplexer MU133 supplies via its data output port either a signal DCs5 which corresponds to the signal DCs4, or a signal DCs5 which corresponds to the signal DCs4, after processing by the second low-pass filtering circuit C133.

The digital signal DCs5 constitutes the output signal of the mean, filtering and decimation circuits 1112. This digital signal DCs5 is then processed by the cyclical ratio digital-analogue converter 1113, which carries out processing which is the inverse of that carried out by the converter 1110, and supplies a processed analogue excitation return signal SSt as output.

The analogue signal SSt is supplied directly to a first input of the output selection multiplexer 112, and is supplied to a second input of the latter via an inverter 1120. The bit B6 of the programming word MP is applied to a selection input of the multiplexer 112, and determines the output of the latter as being the signal SSt or its complementary SSt/. The multiplexer 112 authorises as output inversion of the signal processed, such as to transmit finally to the communication connection 4 the wave form which is expected by the engine control unit 3.

The drive circuit 113 receives the signal SSt or SSt/ provided by the multiplexer 112, and supplies a signal which is designed to drive the gate electrode of the transistor 114. The transistor 114 is fitted in an open collector, and transmits the excitation return signal processed to the engine control unit 3 via the communication connection 4.

The functioning of the mean, filtering and decimation circuits 1112 is described in the following paragraphs.

Figure 3:
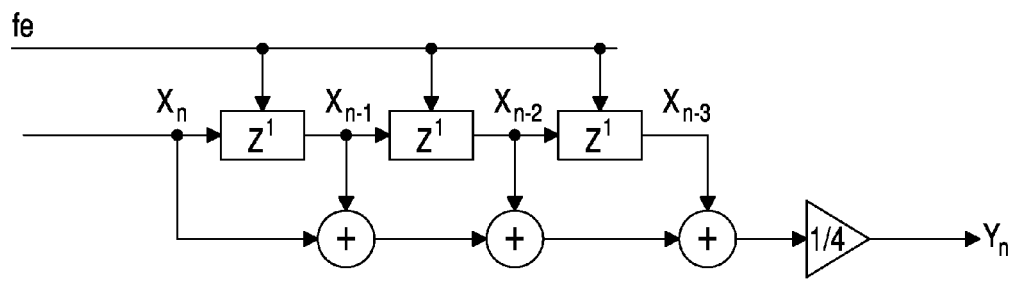
FIG. 3 shows an embodiment of a mean circuit included in the interface in FIG. 1.

FIG. 3 shows an embodiment of a mean circuit C130, which is designed for the present invention. In this figure, the reference "fe" corresponds to a frequency sampling signal fe, the input data are designated as X, the output data are designated as "Y", and the index "n" identifies an item of data concerned in the temporal succession of the data.

The mean circuit C130 in FIG. 3 is a digital filter known to persons skilled in the art, which provides a sliding mean according to the following recurrence formula:

$$Y_n = (1/2^2) \cdot (1 + X + X_{n-1} X_{n-2} + X_{n-3}).$$

Amongst the circuits 1112, the circuit C130 has the function in particular of attenuating part of the frequency spectrum of the signal CDss1, which part can be disruptive for the functioning of the decimation circuit C132 which is placed downstream in the processing chain.

The circuit C130 has the particular feature that it maintains a large pass-band for the signal processed, whilst authorising strong rejection of the clock frequency (Fc) and of the clock frequency divided by 2 (Fc/2) of the decimation circuit C132.

Figure 4A:
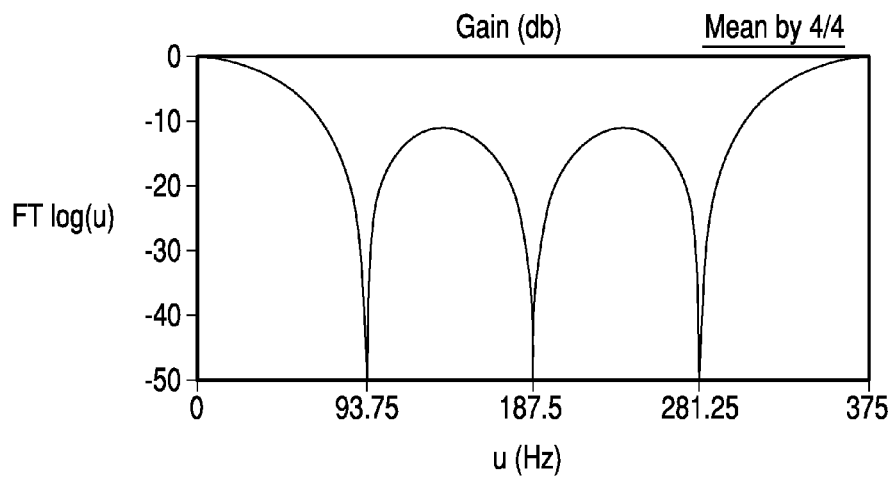
FIGS. 4a and 4b show the spectral responses of two particular embodiments of the mean circuit included in the interface in FIG. 1.

FIG. 4a shows an example of spectral response obtained for the mean circuit C130, with the following definition, for a mean of 4/4:

fe=375 Hz

M=3 delay cells (as represented in FIG. 3 by the blocks $Z^{-1}$)

Transfer function (transformed into z):

$$FT(u) = \frac{\sum_{i=0}^{M} Z(u)^{-i}}{4}$$

$$Z(u) = \exp\left(2\pi \cdot i \cdot u; \frac{1}{fe}\right)$$

According to the above example, the clock frequency Fc for the decimation circuit C132 will advantageously be equal to 187.5 Hz. Rejection at 93.75 Hz is obtained (cf FIG. 4a).

Figure 4B:
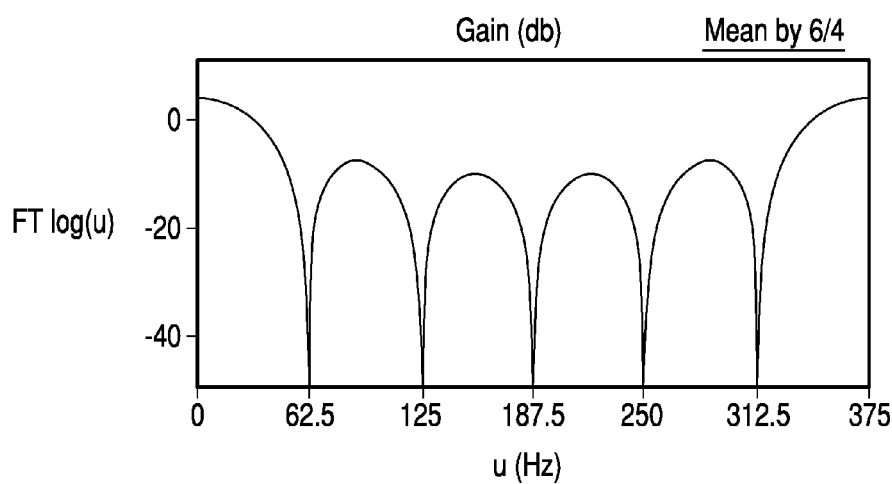
Figure 6A:
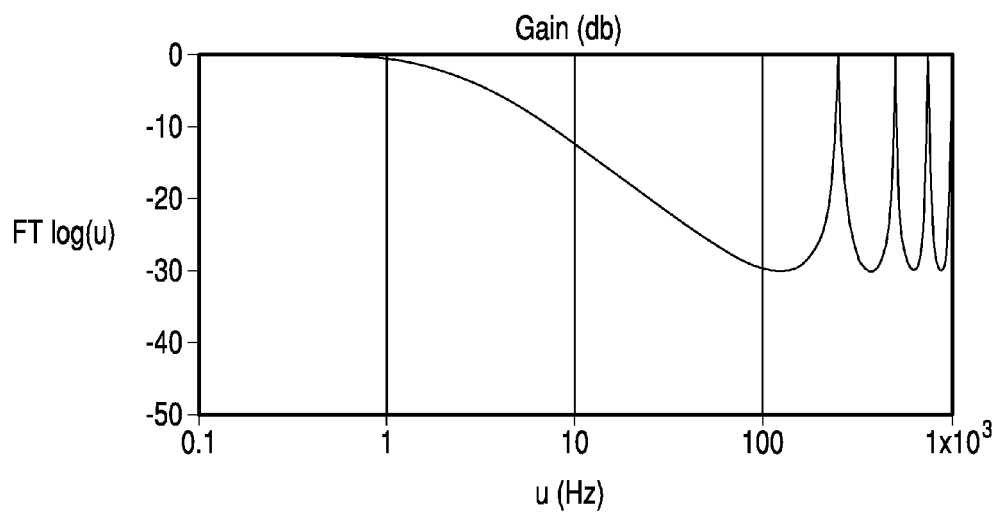
FIGS. 6a to 6d show the spectral responses of four particular embodiments of low-pass filtering circuits included in the interface in FIG. 1.
Figure 6B:
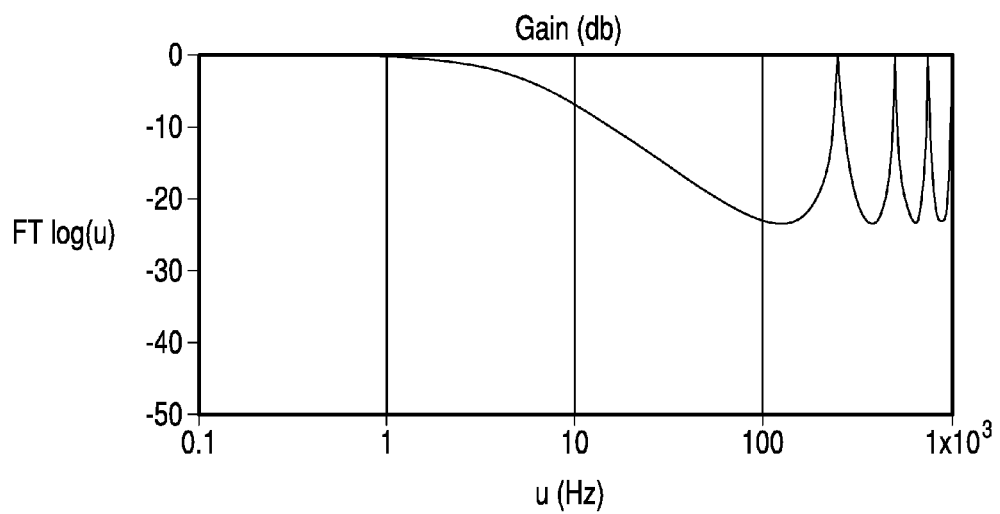
Figure 6C:
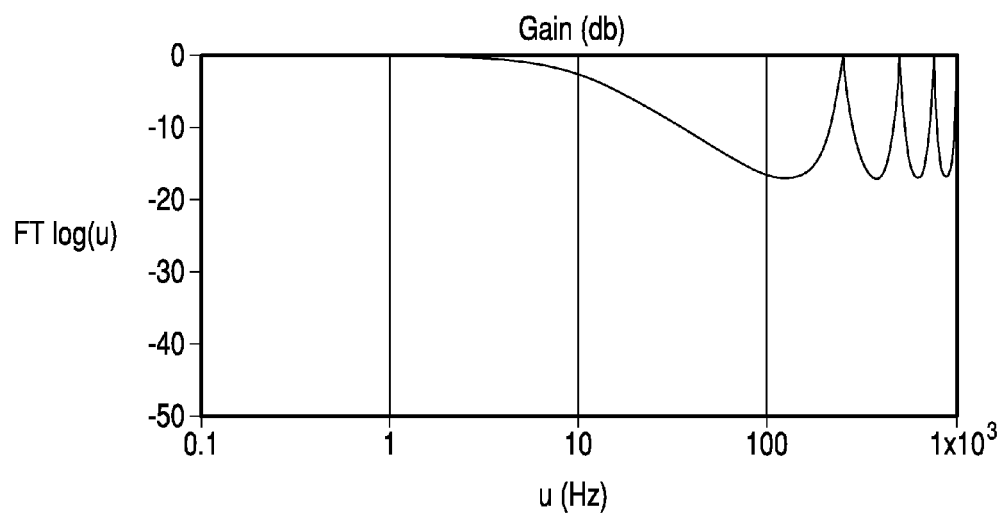
Figure 6D:
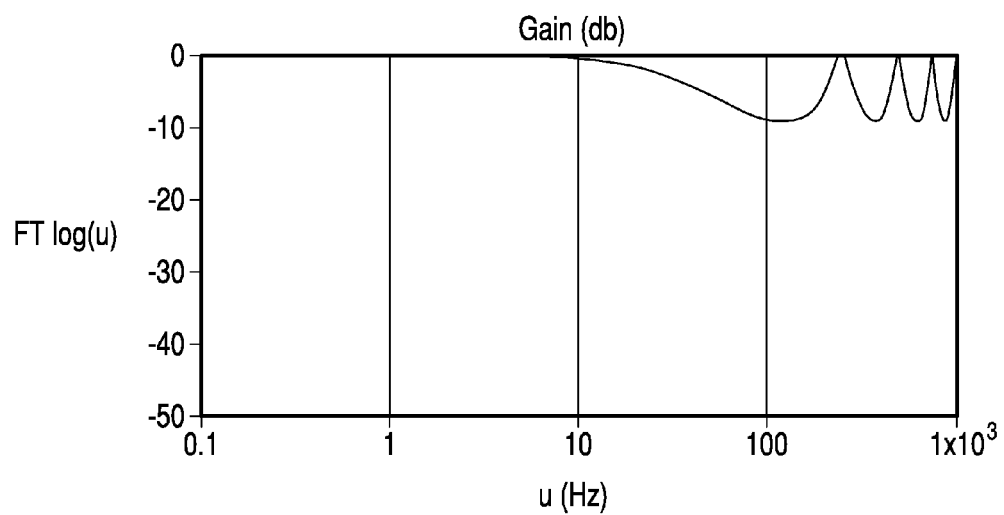

FIG. 4b shows another example of spectral response obtained for the mean circuit C130, with the following definition, for a mean of 6/4:

fe=375 Hz

M=5 delay cells

Same transfer function as above.

According to this example, the clock frequency Fc for the decimation circuit C132 will advantageously be equal to 125 Hz. Rejection at 62.5 Hz is obtained (cf FIG. 4b). This embodiment provides a gain of 3.1 db at low frequency.

With reference more particularly to FIGS. 5 and 6a to 6d, a description is now given of the low-pass filtering function which is carried out by the filtering circuits C131 and C133.

The low-pass filtering function is designed such as to limit the pass-band of the signal processed in order to assure good compatibility with the pass-band of the engine control unit 3.

The transfer function of the filtering carried out is given for example by the following equation:

$$FT(u) = \frac{a}{1 - (1-a)z(u)^{-1}}$$

and the recurrence equation becomes:

$$Y_n = a\left(X_n + \frac{1}{a}Y_{n-1} - Y_{n-1}\right)$$

where x represents the input data and Y represents the output data.

Figure 5:
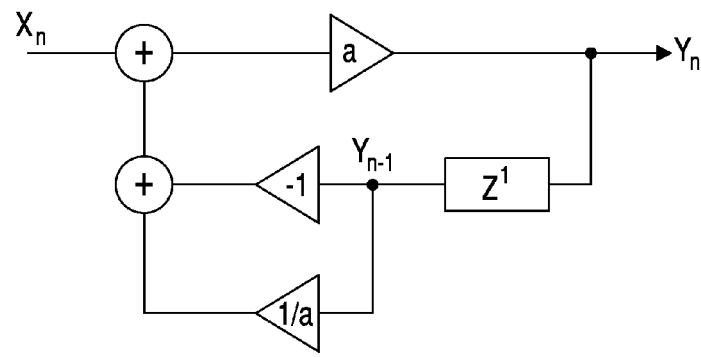
FIG. 5 shows an embodiment of a low-pass filtering circuit included in the interface in FIG. 1.

FIG. 5 shows the diagram of the digital filter obtained on the basis of the above recurrence equation.

The following table shows four examples of filtering carried out on the basis of the above recurrence equation. For these different examples, the sampling frequency Fs selected is equal to 250 Hz. The cut-off frequencies obtained range from 2.5 Hz to 28.7 Hz.

Lines 1 to 4 of the table correspond respectively to the values of the coefficient "a" of $\frac{1}{2^4}=0.0625$, $\frac{1}{2^3}=0.125$, $\frac{1}{2^2}=0.25$ and $\frac{1}{2}=0.5$, and to the spectral responses shown in FIGS. 6a to 6d.

| $F_{-3\,dB}$ | Coeff(a) | Equation implemented | Comments |
|---|---|---|---|
| 2.5 Hz | 0.0625 | $Y_n = \frac{1}{2^4}(X_n + 2^4 Y_{n-1} - Y_{n-1})$ | Fs = 250 Hz<br>max attenuation =<br>−29.83 dB at 125 Hz |
| 5.3 Hz | 0.125 | $Y_n = \frac{1}{2^3}(X_n + 2^3 Y_{n-1} - Y_{n-1})$ | Fs = 250 Hz<br>max attenuation =<br>−23.52 dB at 125 Hz |
| 11.5 Hz | 0.25 | $Y_n = \frac{1}{2^2}(X_n + 2^2 Y_{n-1} - Y_{n-1})$ | Fs = 250 Hz<br>max attenuation =<br>−16.9 dB at 125 Hz |
| 28.7 Hz | 0.5 | $Y_n = \frac{1}{2}(X_n + 2^1 Y_{n-1} - Y_{n-1})$ | Fs = 250 Hz<br>max attenuation =<br>−9.54 dB at 125 Hz |

It will be appreciated that other filterings are possible, and are within the scope of persons skilled in the art, who will select the filtering which is most appropriate for the application envisaged.

As far as the decimation circuit C132 is concerned, this is introduced into the processing chain when a change of frequency (frequency division) is necessary in the signal processed. In fact, in certain applications, the engine control unit 3 can require an excitation return signal which has a frequency lower than that of the real signal. The circuit C132 can be produced conventionally by means of a counter which receives a frequency clock signal Fc.

In general, the mean, filtering and decimation circuits 1112 are programmed substantially according to first and second functioning configurations which make it possible to respond to the constraints which are associated with the techniques for sampling of the signals. These constraints are known to persons skilled in the art, and will not be described here.

According to the first configuration of the circuits 1112, no frequency division is implemented in the signal processed. The signal is then processed by the mean circuit Cl30 and the low-pass filtering circuit C131, and is then supplied directly to the output of the signal processing chain, in order to be converted by the converter 1113 into the analogue signal SSt. The multiplexers MU130, MU131, MU132 and MU133 are controlled respectively by the bits B2, B3, B4 and B5 such that the signal actually only benefits from the processing of the circuits C130 and C131.

According to the second configuration of the circuits 1112, a frequency division is implemented in the signal processed. The signal is then processed by the mean circuit C130, the decimation circuit C132 and the low-pass filtering circuit C133, and is then supplied directly to the output of the signal processing chain, in order to be converted by the converter 1113 into the analogue signal SSt. The multiplexers MU130, MU131, MU132 and MU133 are controlled respectively by the bits B2, B3, B4 and B5 such that the signal actually only benefits from the processing of the circuits C130, C132 and C133.

It will be appreciated that other configurations are possible, and can be implemented by persons skilled in the art, such as to respond to the needs of certain applications. It will be appreciated that the invention is not limited to the particular embodiments previously described, and incorporates all the variants which are included in the scope of the appended claims.

The invention claimed is:

1. A voltage regulator for an alternator of a motor vehicle, comprising:
   an electronic regulation circuit (10) producing an excitation current (Sexc) for an excitation coil (EX) of the alternator (ALT), said excitation current (Sexc) being produced in accordance with a difference between a set voltage (SP) and an output voltage (+Vb) measured at terminals of an electric battery (BAT) of said vehicle, to which said alternator (ALT) is connected electrically, and
   a programmable signal processing interface (11) receiving as input a plurality of representative signals (Sp, SGp, Sexc) representative of said excitation current, producing a selected representative signal (SS) representative of said excitation current, producing an excitation return signal (Srex) based on said selected representative signal (SS) and transmitting said excitation return signal (Srex) to an electronic control unit (3) of said vehicle;
   said signal processing interface (11) comprising an input selection circuit (110) for selection of said selected representative signal (SS) from said plurality of representative signals (Sp, SGp, Sexc), and a signal processing circuit (111) for applying different forms of processing to said selected representative signal (SS) means
   said signal processing circuit (111) including means (MU130 to MU133) for selection of processing to be applied to said selected representative signal (SS);
   said input selection circuit (110) electrically connected to said electronic control unit (3) of said vehicle through said means (MU130 to MU133) for selection of processing to be applied to said selected representative signal (SS);
   said selected representative signal (SS) and said processing to be applied being selected according to a predetermined program provided to said programmable signal processing interface (11).

2. The regulator according to claim 1, wherein said selected representative signal (SS) which is representative of said excitation current is a pulse width modulation signal.

3. The regulator according to claim 1, wherein said signal processing circuit (111) for application of different forms of processing comprises a cyclical ratio limitation circuit (1111) for limiting a cyclical ratio of said selected representative signal and authorizing a variation of said cyclical ratio only between a predetermined minimum value (% DCmin) and a predetermined maximum value (% DCmax).

4. The regulator according to claim 1, wherein said signal processing circuit (111) for application of different forms of processing comprise means (C130) for carrying out processing for calculation of a sliding mean on said selected representative signal.

5. The regulator according to claim 1, wherein said signal processing circuit (111) for application of different forms of processing comprises means (C131, C132) for carrying out low-pass filtering processing on said selected representative signal.

6. The regulator according to claim 1, wherein said signal processing circuit (111) for application of different forms of processing comprises means (C132) for carrying out processing for change of frequency on said selected representative signal.

7. The regulator according to claim 1, wherein said programmable signal processing interface (11) is of the digital type, and comprises an analogue-digital converter (1110) with a cyclical ratio, and a digital-analogue converter (1113) with a cyclical ratio for the corresponding conversions of said selected representative signal.

8. The regulator according to claim 1, wherein said plurality of said representative signals (Sp, SGp, Sexc) includes a pulse width modulation signal (Sp), a gate control image signal (SGp) and said excitation current (Sexc).

9. An alternator for a motor vehicle, comprising a voltage regulator (1) comprising:
  electronic regulation circuits (10) producing an excitation current (Sexc) for an excitation coil (EX) of the alternator (ALT), said excitation current (Sexc) being produced in accordance with a difference between a set voltage (SP) and an output voltage (+Vb) measured at terminals of an electric battery (BAT) of said vehicle, to which said alternator (ALT) is connected electrically; and
  a programmable signal processing interface (11) receiving as input a plurality of representative signals (Sp, SGp, Sexc) representative of said excitation current, producing a selected representative signal (SS) representative of said excitation current, producing an excitation return signal (Srex) based on said selected signal (SS) and transmitting said excitation return signal (Srex) to an electronic control unit (3) of said vehicle;
  said signal processing interface (11) comprising an input selection circuit (110) for selection of said selected representative signal (SS) from said plurality of representative signals (Sp, SGp, Sexc), and a signal processing circuit (111) for applying different forms of processing to the selected representative signal (SS);
  said signal processing circuit (111) including means (MU130 to MU133) for selection of processing to be applied to said selected representative signal (SS);
  said input selection circuit (110) electrically connected to said electronic control unit (3) of said vehicle through said means (MU130 to MU133) for selection of processing to be applied to said selected representative signal (SS);
  said selected representative signal (SS) and said processing to be applied being selected according to a predetermined program provided to said programmable signal processing interface (11).

* * * * *